Figure 1:
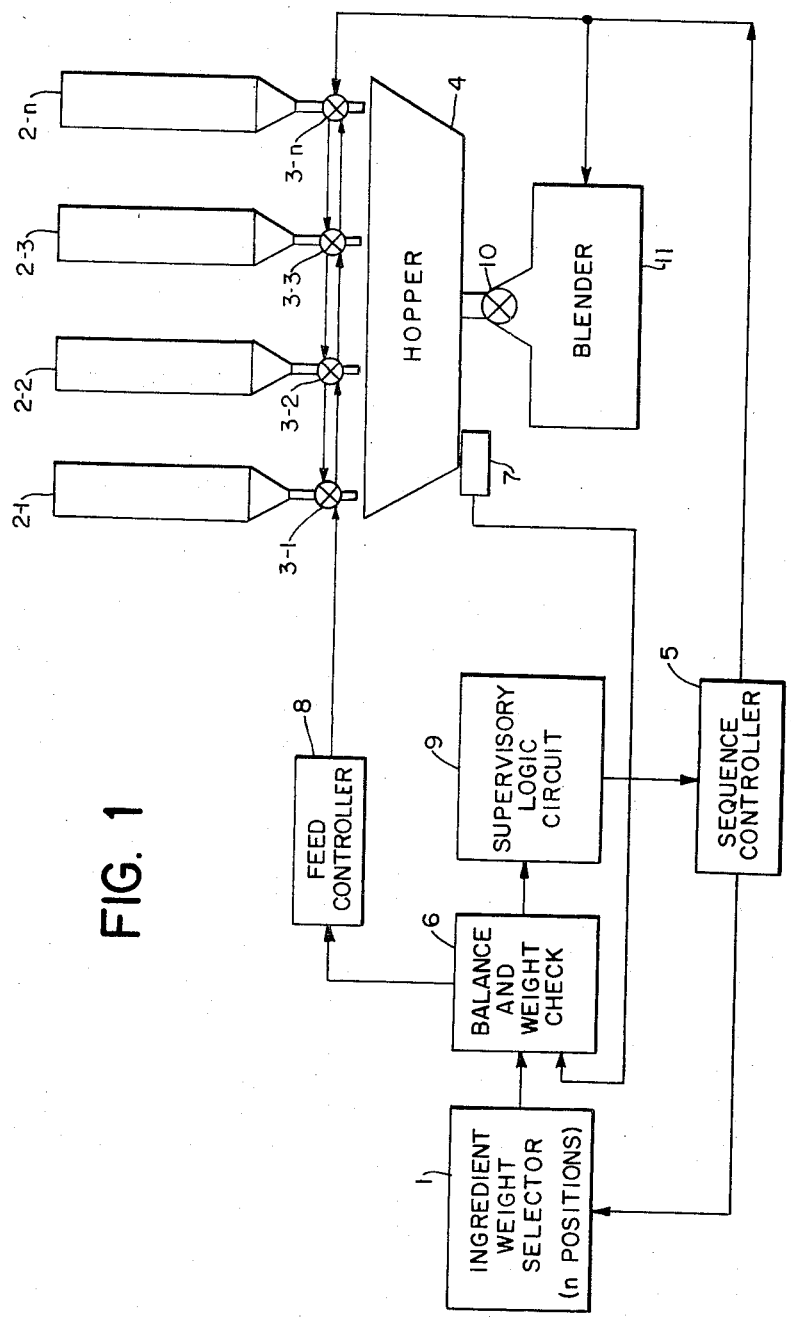

INVENTOR.
MILTON MAXWELL

Jan. 9, 1968   M. MAXWELL   3,362,490
AUTOMATIC BATCH WEIGHER
Filed Aug. 24, 1965   5 Sheets-Sheet 3

INVENTOR.
MILTON MAXWELL

United States Patent Office 3,362,490
Patented Jan. 9, 1968

3,362,490
AUTOMATIC BATCH WEIGHER
Milton Maxwell, Livingston, N.J., assignor to Colgate-Palmolive Company, New York, N.Y., a corporation of Delaware
Filed Aug. 24, 1965, Ser. No. 482,247
21 Claims. (Cl. 177—70)

This invention relates to a system for combining a plurality of different ingredients and more particularly to an electronically controlled system for sequentially adding a predetermined quantity of each of a plurality of ingredients to form a batch.

Many applications exist where it is desired to automatically control the formulation of batches of material having a number of different ingredients. Typical applications include the formation of batches of soaps, detergents, food mixes, and so forth, where predetermined quantities of a plurality of different ingredients are combined and then mixed or blended together.

Where a large number of batches are to be formed over a period of time, these operations are preferably carried on without the use of an operator and on a continuous and automatic basis. This gives rise to the need for systems capable of automatically weighing out predetermined quantities of a number of ingredients.

The present invention relates to a weighing system of the foregoing type whose controls are primarily electronic. The system is simple to set up and operate, relatively economic to construct, and accurate in its operation. In accordance with the invention, the weights of the different ingredients to be combined are selected by producing an analog signal respectively corresponding to each ingredient. An analog signal is applied to an error signal amplifier whose other input is a signal from a device which senses the amount of the ingredient already present in the hopper into which the ingredients are dispensed. The output error signal from this amplifier operates a feed rate controller which determines the rate at which a particular ingredient is to be charged into the hopper.

The system of the present invention also uses electronic logic circuits which operate in response to the magnitude of the error signal to control the opening of the valves of a number of individual containers from which the ingredients are dispensed into the hopper. The logic circuits also automatically cycle the system through its various operating steps. An arrangement is also provided whereby the logic circuits can be over-ridden to permit certain manual operations to be performed and/or manual control of the system to be achieved.

Since the system of the present invention uses analog voltages of the direct current variety and logic circuits, which also are essentially DC devices having only two states, "yes" or "no," the problems encountered with prior art systems using alternating current (AC) signals and the necessary control transformers and phase measuring devices are eliminated. The DC analog signals of the present invention are more easily amplified and magnitude measurements made thereof to control the operation of the system as compared to the prior art systems using AC signals which are generally operated at low signal amplitude levels. Also, the computer type logic circuits of the present invention are simpler to maintain and is more accurate in its operation.

It is therefore an object of the present invention to provide an automatic batch weighing system.

A further object is to provide a batch weighing system in which electronic logic circuits are utilized to control the operation of a plurality of batching steps.

Another object is to provide an automatic batch weighing system having a feed rate controller and logic circuits responsive to the weight condition of a hopper holding ingredients to be be blended, the logic circuits automatically controlling the sequential charging of a number of ingredients into the hopper.

An additional object is to provide a control element for a feed rate controller to speed up its operation.

Other objects and advantages of the present invention will become more apparent upon reference to the following specification and annexed drawings in which:

FIGURE 1 is an overall block diagram of the system; and

FIGURES 2, 3, 4 and 5 when taken side-by-side is a schematic wiring diagram of the system.

GENERAL OPERATION

FIGURE 1 illustrates the components of the system of the present invention in general block diagram form. The various system components are described in detail below. In FIGURE 1, an ingredient weight selector 1 is provided which has as many stations 1—1 through 1–n as desired. Each station includes a device, such as a voltage supply and an adjustable potentiometer, for producing an electrical voltage or current analog signal. The analog signal produced at each weight selector station is pre-set by an operator to correspond to the quantity (weight) of an ingredient to be dispensed in a measured quantity from a respective one of a number of ingredient containers 2–1 through 2–n into a hopper 4 through a respective control valve 3–1 through 3–n. There can be as many containers 2 as desired, each container having a corresponding control valve 3 and a corresponding weight selector station 1.

A sequence controller 5 is provided for stepping the system through the various steps of an operating cycle. Upon initiation of an operating, or batching, cycle controller 5 first enables valve 3–1 to open to dispense the ingredient in container 2–1 into the hopper 4. Sequence controller 5 also applies the analog signal from weight selector station 1—1 corresponding to the ingredient from the first container 2–1 to be dispensed into hopper 4, to a balance and weight check circuit 6. Circuit 6 receives another input signal from a weight sensing device 7, such as a load cell, connected to hopper 4. The load cell output signal corresponds to the gross weight of hopper 4 and the material therein.

The analog weight signal from station 1—1 is compared with the load cell output signal in circuit 6 to determine whether the quantity of material dispensed from container 2–1 has satisfied the requirements of the pre-set analog weight signal of station 1—1. If an underweight condition exists, meaning that the required amount of material has not been dispensed, then weight check circuit 6 produces an output (error) signal which operates a feed controller 8 connected to control the ingredient outflow rate from container 2–1 through valve 3–1 into hopper 4. The flow rate is controlled in a predetermined manner which is described in greater detail below.

Weight check circuit 6 has another output which is connected to the input of a supervisory logic circuit 9. As long as the weight check circuit 6 senses that the material in hopper 4 is underweight it produces a signal which causes the logic circuit 9 to keep the sequence controller 5 disabled. As the hopper fills, the error signal diminishes and when the weight of the ingredient dispensed from container 2–1 into the hopper comes within a predetermined limit of the amount set by station 1—1, the error output signal is no longer effective. When this occurs the feed rate controller 8 is shut off, thereby stopping the flow of the ingredient from container 2–1 into the hopper.

After valve 3–1 is shut off, the sequence controller 5 is energized by logic circuit 9 to step the system one position in its cycle of operation. This adds the analog signal from weight selector station 1-2, corresponding to the weight of the ingredient from container 2—2 to be dispensed through valve 3-2 into hopper 4, to the input of the weight check circuit 6. At the same time, controller 5 enables valve 3-2. The new error signal produced by circuit 6 in response to the new underweight condition operates the feed controller 8 to set the flow rate of the ingredient from container 2—2 into hopper 4. At the same time circuit 6 controls logic circuit 9 to keep the sequence controller disabled. This state of operation continues until the cumulative weight of the ingredients from the two containers 2-1 and 2—2 in hopper 4 equals, within predetermined limits, the weight set in by the first two stations 1—1 and 1-2 of weight selector 1. At this time the error signal diminishes to the feed rate controller to shut off valve 3-2 and logic circuit 9 energizes controller 5 to step the system one more position to dispense the ingredient from container 2-3.

The sequential stepping of controller 5 in response to successive determinations of correct cumulative weights in hopper 4 is carried out until the ingredient from the last container 2–$n$ has been dispensed into the hopper. When the correct total weight of all ingredients is sensed by weight check circuit 6, a signal is sent to a blender 11, or mixer. If the blender is in a condition to receive the contents of the hopper, it actuates the logic circuits to step the sequence controller to a position where it opens a valve 10 at the bottom of hopper 4 permitting all the pre-weighed ingredients to be loaded into a blender or mixer 11. After all of the material is loaded into blender 10, controller 5 closes valve 10 and automatically sets up the system for another batching cycle to dispense the ingredients from the various containers 2 into hopper 4. At the start of the next batching cycle, the controller turns on the blender to mix the ingredients from the preceding batch. This automatic operating cycle continues repetitively until disabled by an operator or shut off by a predetermined system condition, such as emptying of one of the containers 2 or by an overweight condition in the hopper.

Figure 2:
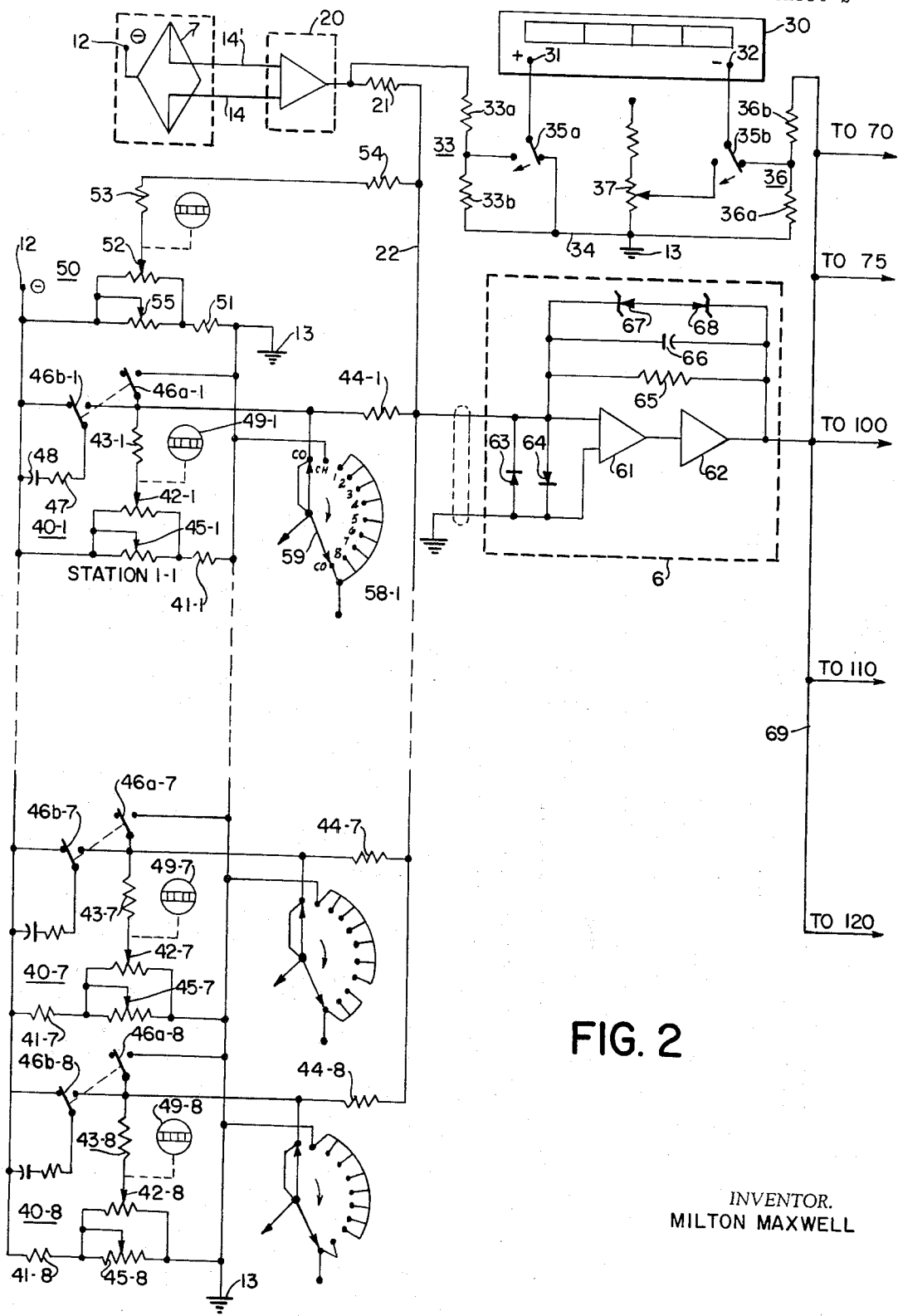
Figure 3:
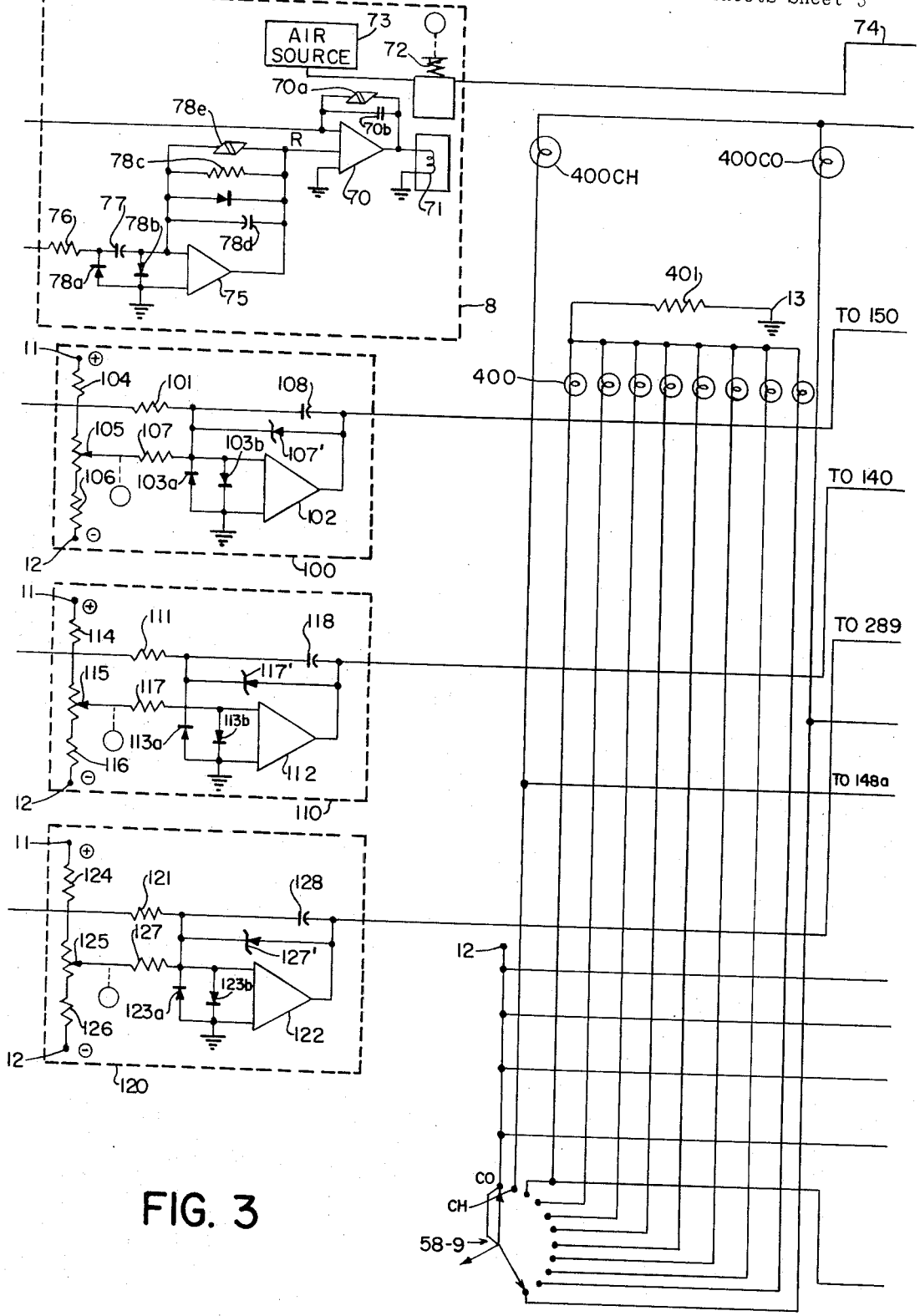
Figure 4:
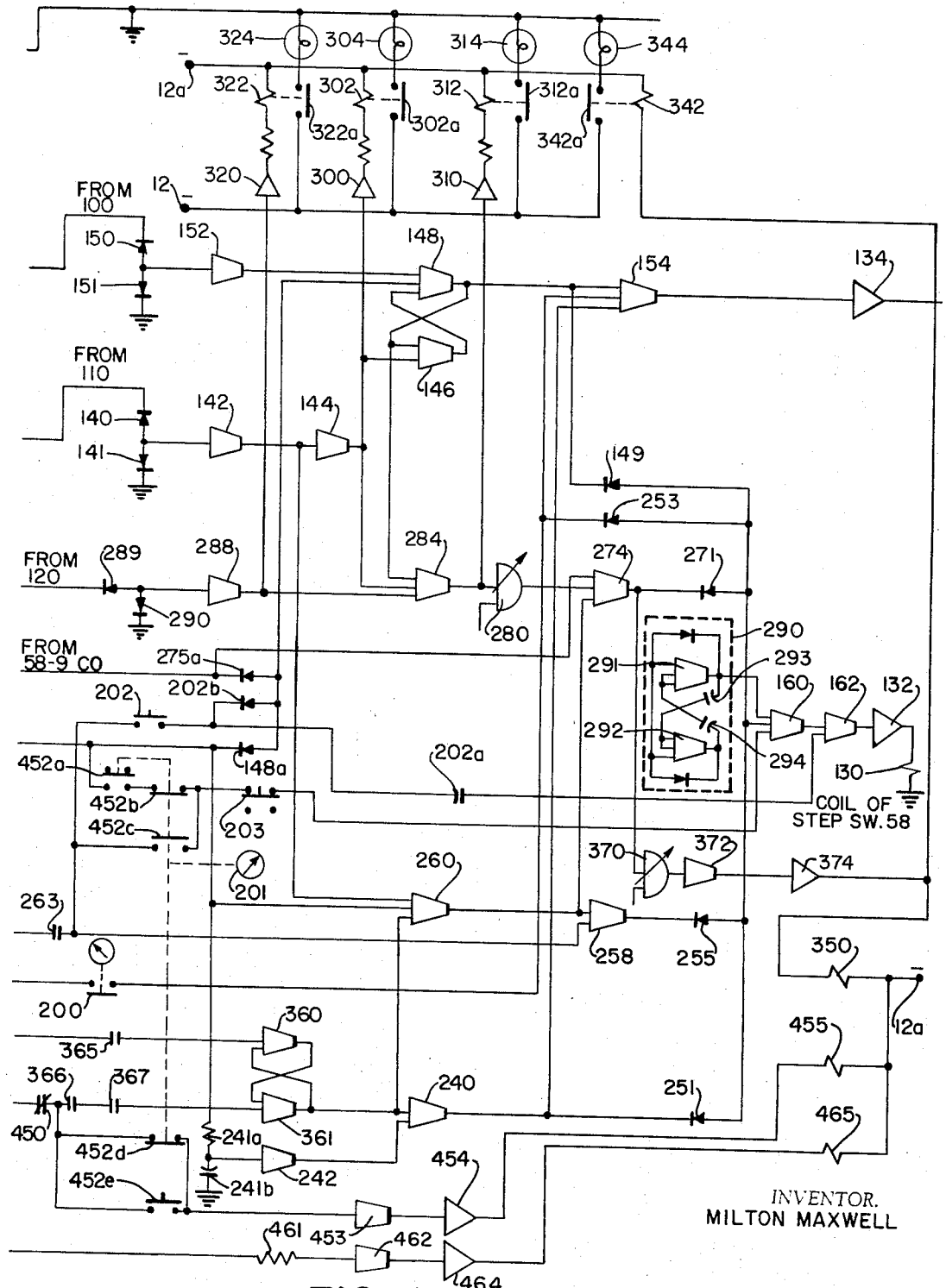

With the foregoing general operating principles established, reference is now made to FIGS. 2–4 which when taken side by side show the details of the components of the system of FIG. 1. These are described below.

LOAD CELL AND GROSS WEIGHT AMPLIFIER

Figure 5:
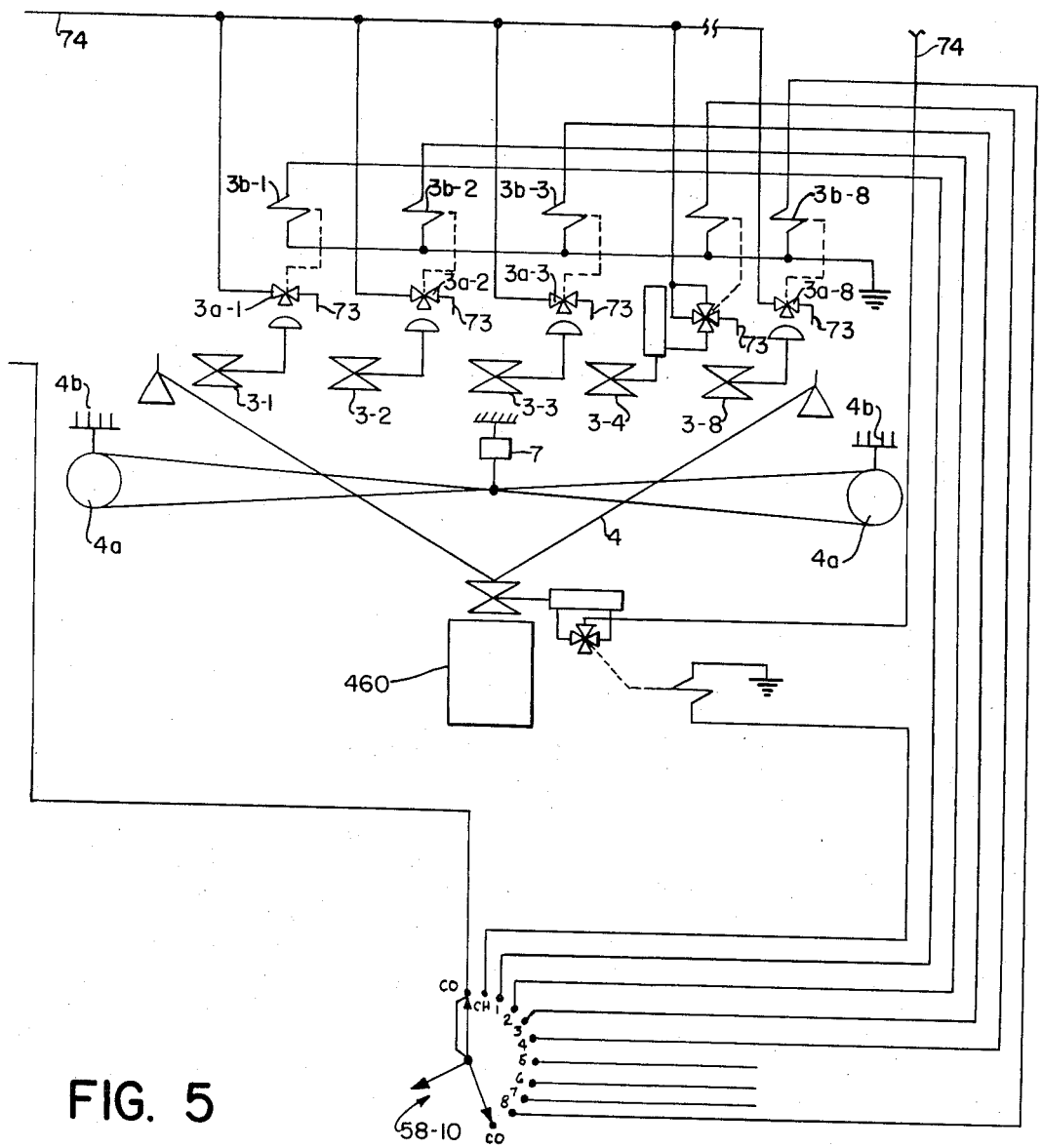

The load cell 7 is preferably of the strain gauge type and is located at the hopper 4 (FIG. 5). A suitable framework 4a of a suspension hopper beam system suspends the hopper from a fixed reference plane 4b and the load cell is positioned at the transfer lever between the framework and the reference plane. In this position the load cell has a strain applied theerto which is proportional to the weight of the hopper and the material therein, that is, the hopper gross weight. The electrical connections for the load cell 7 are shown in FIG. 2. The strain gauge is of any suitable conventional construction and it is supplied at one terminal with negative voltage from any suitable source (not shown) from a terminal 12. Terminal 12 is the negative voltage supply for the system. Strain gauge load cell 7 produces a voltage across its two output terminals 14 and 14' in response to the weight of the material in the hopper. This output voltage increases in direct proportion to the gross hopper weight.

The output terminals 14 and 14' of the strain gauge load cell 7 are connected to the inputs of a gross weight amplifier 20 which is a data type linear amplifier. The output signal of the gross weight amplifier 20 is directly and linearly proportional to the input signal from the strain gauge load cell 7 which in turn is a measure of the gross weight of the hopper. Amplifier 20 is of any suitable conventional construction and is preferably a direct current type of amplifier having good linearity and stability characteristics. Many suitable amplifiers of this type are available commercially and no further description thereof is necessary.

In a preferred embodiment of the system of the present invention the gross weight amplifier 20 produces a predetermined output voltage for each pound of gross weight of the hopper. For example, the gross weight amplifier may produce 2.4 millivolts per pound of gross hopper weight. This output voltage is applied through a resistor 21 to a summing line 22. If, also for example, the value of resistor 21 is 100K (100,000 ohms), each pound of hopper gross weight produces .024 microamp of current on a line 22 which is one input signal to the weight check circuit 6.

INGREDIENT WEIGHT SELECTOR

As explained above, the system operates to control the feeding of an ingredient from a container 2 into the hopper 4 in response to the weight measured by the load cell 7 as compared with an analog signal corresponding to a predetermined weight set in by the operator at a weight selector station 1. As described previously, the gross weight of the hopper is converted into a current (voltage) signal which appears at the output of resistor 21 on summing line 22.

Summing line 22 also receives the analog signals corresponding to the weights of the respectively different ingredients to be dispensed into the hopper. Each analog current, or voltage, signal corresponding to the weight of an ingredient is produced by a respective weight selector circuit 40 (FIG. 2) located at each weight selector station 1. The weight selector circuits 40 are substantially identical so the description given below applies to all of them. The prefix reference numeral is used to designate the same component for each station while the suffix numeral corresponds to the weight selector station number. While eight stations are illustrated in FIG. 2, it should be understood that any number of stations can be provided.

Each of the weight selector circuits 40 comprises a voltage divider formed by a fixed resistor 41 and a variable potentiometer 42 connected in series between the negative potential supply point 12 and a point of reference potential such as ground 13. A desired voltage, corresponding to the voltage analog of a weight in pounds, is picked off across potentiometer 42 by moving its slidable tap. This voltage is applied through a fixed value resistor 43 which is connected to the summing line 22 through another fixed value resistor 44. The knob 49 controlling the potentiometer's slider is preferably calibrated directly in pounds so that an operator can easily set in the weight of each ingredient.

The relationship of the values of resistors 41 and 42 at each weight selector station 1 is selected to produce a predetermined voltage for each pound of an ingredient from a corresponding container 2 to be loaded into the hopper. In the preferred embodiment of the system being described, this is illustratively selected to be 6.3 millivolts per pound. The voltage at the output of resistor 43 is converted into a current analog by the fixed resistor 44 whose value is selected to produce a fixed value of current per pound on line 22. This can be, for example, .024 microamp per pound, which corresponds to the same value of current per pound produced at the output of gross weight amplifier 20. It should be noted that whereas the voltages and currents from circuits 40 are negative in polarity with respect to ground 13, the voltage and current from gross weight amplifier 20 is positive in polarity so that when added algebraically, they cancel each other.

Each of the weight selector circuits 40 is also provided with a trimming potentiometer 45 whose winding is connected across the winding of potentiometer 42. The slider arm of potentiometer 45 is connected to one end of the winding of potentiometer 42 so that varying the position of the slider of potentiometer 45 varies the amount of resistance in parallel with potentiometer 42. This is a conventional method of providing a fine adjustment for potentiometer 42 to thereby establish the desired voltage relationship per pound.

In some situations it is desired to omit one or more ingredients from the batch weighing cycle. This is accomplished by a respective switch 46, which is also accessible to the system operator, connected to each of the circuits 40. Each switch 46 has two single-pole double-throw sections 46a and 46b and each of the switch sections 46a is shown in FIG. 2 with its movable arm in the normal operating position permitting the voltage at the output of a resistor 43 to be added to the summing line 22. When the arm of a switch section 46a is moved to the right stationary contact, the voltage on the end of its respectively connected resistor 43 from the voltage divider 41–42 is connected to ground and no voltage from the respective circuit 40 reaches the summing line 22. In this manner one or more of the weight selector stations can be rendered ineffective at will since its analog signal is prevented from reaching the summing line 22.

Section 46b of each switch has its movable arm mechanically linked to the movable arm of switch section 46a. The center arm of each switch section 46b receives a small voltage through a series connected resistor and capacitor 47 and 48 which "welds" the arm to a stationary contact. This insures positive closure of the ganged movable arms of both sections of the switch.

SEQUENCE CONTROLLER

The sequence controller 5 comprises a stepping switch 58 which is driven by a step switch driver (FIG. 3) 132 under the control of the supervisory logic circuit 9. Switch 58 illustratively has ten decks numbered 58–1 through 58–10. This is described in greater detail below. Decks 58–1 through 58–8 are shown in FIGURE 2, each deck being associated with a corresponding numbered weight selector circuit 40. The purpose of these eight decks of switch 58 is to insure that only one voltage from a circuit 40 is added to the summing line 22 for each successive step of the switch. Decks 58–9 and 59–10 of the switch are shown in FIGS. 4 and 5, respectively, and their operation is described in detail below.

As shown in FIG. 2, which illustrates one type of switch 58 used with the present invention, each of the first eight decks has twelve contacts arranged over approximately a 120° arc. The switch is provided with a movable wiper contact 59 having three arms. The arms are also spaced approximately 120° apart so that, in the position shown in FIGURE 2, two of the wiper arms engage the first and the last contacts of each deck of the switch. In any position of the wiper arms other than from that shown, only one of them engages a stationary switch contact on each deck.

The stationary switch contacts of each deck 58–1 through 58–8 are labelled clockwise as follows: CO, corresponding to cycle over or cycle complete; CH corresponding to blender charging after a complete weighing cycle has been completed; contacts 1 through 8, corresponding to the connection of circuits 40–1 through 40–8 for determining the quantity of a particular material to be loaded into the hopper; and CO again.

Each of the decks 58–1 through 58–8 is wired to apply the voltage from a corresponding numbered weight selector circuit 40–1 through 40–8 to the signal line 22 at a time when the ingredient from a container 2 whose weight is set by a circuit 40 is to be charged into the hopper and during the successive charging steps thereafter. When a batching cycle is completed and the wiper arms 59 are in the CO position as shown, and all of the currents from the circuits 40 are balanced by the hopper gross weight a signal is sent to the blender. If the blender is ready to receive a charge, its shroud comes up and hits the hopper causing a momentary false underweight condition. This causes the logic circuit to step the switch 58 to the CH position where the hopper valve 10 is opened, dumping the ingredients into the blender. In the CH position, the output of each resistor 43 is grounded, which is the basis for starting a new batching cycle. Valve 10 closes after the hopper contents are dumped into the blender.

Switch 58 is stepped one more position clockwise, corresponding to the first step of the new cycle wherein the ingredient from container 2–1 is to be dispensed into the hopper, wiper arm 59 of deck 58–1 contacts the "1" position and the output voltage from the upper end of resistor 43–1 is permitted to be added to the signal summing line 22. All of the other circuits 40–2 through 40–8 have their outputs grounded since their "1" contacts are connected to ground. The voltage from circuit 40–1 is applied to line 22 for all of the subsequent positions "2" through "CO" of deck 58–1 since none of these contacts are grounded. In the "1" position of switch 58, a signal is sent to the blender to make it retract its shroud and start operating.

The contacts of all of the decks 58–1 through 58–8 are wired so that corresponding to the contact number engaged by the wiper arm of a deck, the circuit 40 connected to the deck and the preceding lower suffix numbered circuits 40 apply their voltages to the signal summing line 22 while the voltages from all higher suffix numbered circuits 40 are grounded. For example, when stepping switch 58 moves the wiper arms 59 of the decks to contact "5," circuits 40–1 through 40–5 have the upper ends of their resistors 43 ungrounded and apply their voltages to line 22 while circuits 40–6, 40–7 and 40–8 have their outputs grounded. The current on summing line 22 increases with each step of the switch 58 since the currents from circuits 40–1 through 40–8 are successively added thereto. The signals from circuits 40 are opposite in polarity to the signal from gross weight amplifier 20.

TARE BALANCE

A tare balance circuit 50 also applies a signal to the summing line 22. Tare balance circuit 50 is substantially identical in construction to the weight selector circuits 40 and includes a voltage divider formed by a fixed resistor 51 and variable potentiometer 52 whose slider arm is connected to a fixed resistor 53. The upper end of resistor 53 is in turn connected to the signal summing line 22 by fixed resistor 54. The purpose of the tare adjusting circuit 50 is to compensate for the dead weight of the hopper and any other material or components which might be in the hopper prior to charging it with the first ingredient. The control for the slider arm of potentiometer 52 is adjusted with no material in the hopper to produce a zero weight indication on a weight indicator 30.

The operation of the circuit 50 is the same as the circuits 40. However, no switch arrangement 46 is provided to short out the signal from the tare circuit 50 and there is no connection to the stepping switch 58 since this tare signal is necessary at all times to provide an accurate indication of the quantity of material being weighed. The polarity of the tare circuit output signal is also opposite to that of the ouput signal from he gross weight amplifier 20.

UNBALANCE AMPLIFIER

As indicated above, the signal summing line 22 receives a number of signals. One of these is from gross weight amplifier 20 and is of a first polarity and of a magnitude corresponding to the gross weight of the hopper. The signals from weight selector circuits 40 and the tare circuit 50 are of the opposite polarity and all of these appear on signal summing line 22. In operation of the system it is the algebraic sum of the signal from gross weight amplifier 20 and the signals from circuits 40 and 50 which is used as an error signal to control the operation of the feed controller 8 and provide the input to the logic supervisory circuit 9. This error signal is produced by the weight balance and weight check circuit 6 (FIG. 2).

Weight check circuit 6 is an amplifier circuit formed by a conventional operational amplifier 61 and current booster amplifier 62 connected in cascade. Operational amplifiers, as is well known in the art, are relatively high gain devices with good stability and linearity. The input signal to amplifier stage 61 is the algebraic sum of the signal on summing line 22 and stage 61 has a pair of oppositely poled diodes 63 and 64 connected between its input and ground 13 to prevent overload by shorting any excessive magnitude input signal to ground. A feedback network including a parallel connected resistor 65 for fixing amplifier gain and a capacitor 66 for reducing noise is connected between the output of amplifier 62 and the input of amplifier 61. A pair of oppositely poled zener diodes 67 and 68 is also connected in parallel with the feedback network to limit the feedback signal to keep the amplifier. The operation of the zener diodes 67 and 68, which break down at a predetermined voltage to produce a constant voltage drop thereacross, is well known in the art.

To explain the operation of the weight check circuit 6, consider that the stepping switch 58 is in the "CH" position wherein the outputs of all of the circuits 40 are grounded and the weight of the hopper 4 is balanced off by the signal from tare circuit 50. In this case the amplitude of signal on line 22 is zero, and the amplifiers 61 and 62 also produce a zero output. As the sequence controller (stepping switch) shifts to the first step in the cycle to charge hopper 4 with the first ingredient, the current from circuit 40–1 is applied to line 22. This unbalances the signal on line 22 from zero and the amount of unbalance, corresponding to the weight of the first ingredient to be charged into the hopper, is amplified by circuit 6. The amplified output signal, which is the error signal, appears on an over-under bus line 69 to operate the feed controller 8. As the first ingredient is charged into the hopper, the hopper's changing gross weight is sensed by the load cell 7 and a signal of corresponding amplitude is produced at the output of gross weight amplifier 20. The gross weight amplifier output signal increases in magnitude as more of the first ingredient is charged into the hopper and, since it is opposite in polarity to the signal from the circuit 40–1, the amplitude differential between the two signals and the error signal at the output of circuit 6 on line 69 diminishes.

When the quantity of the first ingredient charged into the hopper is substantially equal to that pre-set by weight selector 40–1, the weight check circuit 6 produces a signal on line 69 which actuates additional circuits, to be described below, to stop the charging of the first ingredient and actuate the stepping switch 58 to shift it over to contact position "2." The voltage from circuit 40–2 is now added on to line 22 so that another unbalance exists at the input to circuit 6 causing amplifier 62 to produce an error output signal for controlling charging of the hopper with the second ingredient. This charging continues until the gross weight signal at the output of amplifier 20 substantially equals the signals from weight selector circuits 40–1 and 40–2 and the tare balance circuit output signal. At this time the system is shifted to dispense the third ingredient into the hopper. This sequence continues until all eight weight selector circuits 40 have added their signals onto line 22 and the correct quantity of material has been dispensed from each of the containers 2 into the hopper.

The polarity of the error output signal on line 69 tells the system whether or not the hopper is overweight or underweight with respect to the particular ingredient which is supposed to be placed therein. In the preferred embodiment of the invention being described, the connection of amplifiers 61 and 62 is selected so that for an overweight condition, that is more material being present in the hopper than is to be placed therein in accordance with the settings of the circuits 40, a negative signal is produced on line 69. In response to an underweight condition, where the hopper has not been filled with a sufficient quantity of a material at any one portion of the charging cycle, a positive signal is produced. The magnitudes of these positive and negative signals, corresponds to the underweight or overweight error in pounds. The error is selected to be a predetermined quantity per pound, for example 24 millivolts per pound.

WEIGHT INDICATOR

A weight indicator 30, which is of the conventional voltmeter type having a plurality of driven digital displays, is used to show either the underweight (or overweight) or the hopper net weight. In the position shown for switches 35a and 35b, the positive terminal 31 of indicator 30 is grounded while the negative terminal 32 receives the signal on over-under bus-line 69 from the junction of two resistors 36a and 36b of a voltage divider 36. Divider 36 scales down the voltage on line 69 from, for example, 24 mv. per pound to 1 mv. per pound so that indicator produces a direct weight indication in pounds of the over or underweight condition.

In the other position of switches 35, for a net weight indication, positive terminal 31 receives the gross weight signal at the output of amplifier 20 from the junction of resistors 33a and 33b of a voltage divider 33. Divider 33 scales down the voltage from amplifier 20 from, for example, 2.4 mv. per pound to 1 mv. per pound so that indicator 30 will produce a direct weight reading. The center arm of a potentiometer 37 now connected to the negative terminal 32 is a tare balance control so that the indicator can be set to compensate for the dead weight of the hopper.

FEED RATE CONTROLLER

The feed rate controller 8 (FIG. 3) includes a feed rate controller amplifier 70 which produces an output signal used to control the motion of a solenoid 71 of a biased pneumatic relay 72. This relay, which has a shutter or diaphragm (not shown) acts as a valve in the path of compressed air from a constant pressure air source 73. The variable pressure output from biased relay 72 is applied over a line 74 to the ingredient discharge valves 3 (FIG. 5).

Each valve 3 has a differential control element 3a which receives the feed rate air pressure control signal from line 74 and a constant pressure input from a suitable source of pressure such as 73. The constant pressure signal provides the biasing force against which the flow rate pressure signal operates. It should also be noted that each valve 3 has a solenoid 3b connected to the differential control element 3a. Each solenoid 3b–1 through 3b–8 is operated by the correspondingly numbered contact "1" through "8" of the tenth deck 58–10 of the stepping switch. The differential control element 3a of a valve 3 is operable only when the solenoid 3b for that valve is energized. As is described in greater detail below, a respective solenoid 3b–1 through 3b–8 is energized by switch 58 as the analog signal from the respective corresponding numbered weight selector station is applied to summing line 22.

When pneumatic relay 72, which is normally biased to a slightly open condition, has its solenoid 71 actuated to hold open the relay and pass maximum air pressure to the valves 3, the ingredient being charged flows into the hopper at the maximum rate through the actuated valve 3 whose solenoid 3b is energized by switch 38–10. Depending upon the decrease in air pressure through the relay 72 under control of its solenoid 71, the flow of air to the differential control element 3a of the actuated valve is decreased thereby throttling the flow of the ingredient into the hopper.

Feed rate controller amplifier 70 receives one input signal from the under-over bus-line 69. The over-under signal, according to the illustrative system being described, is positive in polarity when an underweight condition exists in the hopper. This positive signal causes amplifier 70 to conduct and hold relay valve 72 open thereby maximizing the flow of air from source 73 to the differential control elements 3a.

In the preferred embodiment of the invention, maximum flow rate of an ingredient from a container 2 is maintained and throttling of the feed rate is not effected until a predetermined underweight condition is reached. This can be any desired weight. To accomplish this the feed rate controller amplifier 70 is biased to hold relay 72 open to permit maximum material flow rate until the predetermined underweight is reached. When the positive polarity underweight signal is a value representative of less than the predetermined weight, then amplifier 70 becomes less conductive closing relay valve proportionately to reduce the air flow and throttle the ingredient flow rate.

A feed rate transmitter amplifier 75 (FIG. 3) provides for smooth and accurate throttling operation of the feed rate controller 8. The input of amplifier 75 is connected to the over-under bus 69 through a resistor 76 and a capacitor 77. Diodes 78a and 78b provide overload protection. A feedback circuit formed by fixed resistor 78c, non-linear resistor 78e, which for example may be a Thyrite resistor, and capacitor 78d is connected across the amplifier. Resistor 76 and capacitor 78d are amplifier noise reduction elements. Capacitor 77 and resistors 78c and 78e form a differentiating, or rate taking, circuit to make the output signal of amplifier 75 proportional to the rate at which the underweight signal on line 69 decreases. This rate signal decreases as the underweight condition approaches zero since the material flow rate decreases as controller 70 closes relay 72 in response to the diminishing underweight signal on line 69. The non-linear resistor 78e, which is voltage sensitive and has a low resistance at high voltage levels and a high resistance at low voltage levels, increases the overall gain of amplifier 75 as the rate of change of the underweight signal diminishes. Thus, amplifier 75 has the highest gain when the underweight signal approaches zero.

The rate output signal of amplifier 75 is applied to an input of controller 70 where it is balanced against the continually decreasing over-under signal from line 69. The rate modifies the throttling of the ingredient discharge produced by controller 70. As long as there is no sudden change in the underweight signal, the ratio of the underweight signal to the rate of change of the underweight signal remains constant and throttling is effected in a smooth manner primarily under the control of the decreasing underweight signal from line 69 applied to controller 70. If there is a sudden decrease in the underweight signal, such as would be produced by a lump of the ingredient falling into the hopper, the rate signal from transmitter 75 also increases suddenly and causes amplifier 70 to become less conductive to close relay 72 momentarily to shut off valve 3, or decrease its flow. A decrease in the rate signal, such as would be caused by irregularity in the outflow of the ingredient causes amplifier 70 to become more conductive to increase the outflow rate.

As an important feature of the invention, the flow controller 70 which operates relay 72, is also provided with a non-linear feedback resistor 70a. The controller 70 is effectively an integrating type operational amplifier, as indicated by the capacitor 70b connected across the input and output. The non-linear feedback resistor 70a, which also may be of the Thyrite voltage sensitive type, prevents the controller 70 from saturating at small values of underweight if such a condition persists for any length of time, as if the supply of material runs out and is not replaced for several minutes. In this case the integrating type controller 70 would tend to open the valve 3 more until the amplifier 70 saturated, giving maximum flow rate when the supply of material was replenished.

TRIGGER CIRCUITS

Three trigger circuits 100, 110 and 120 (FIG. 3), which are part of the supervisory logic circuit 9, have their respective inputs connected to the over-under bus-line 69. Trigger circuit 100 is the feed cut-off trigger and senses when the error signal on line 69 corresponds to an underweight condition indicating that the hopper has been filled during a particular charging step with the desired quantity of material to within a predetermined tolerance limit. Operation of trigger 100 causes the logic circuit 9 to stop the flow of a particular ingredient into the hopper and steps switch 58 one position to start the flow of the next ingredient into the hopper.

Trigger circuit 110 senses an underweight condition in the hopper, meaning that material still has to be added in order to satisfy the requirements set in by the weight selector circuits 40. When an underweight condition exists, circuit 110 operates the logic circuit to keep material flowing into the hopper and to prevent operation of the stepping switch 58. Trigger 120 senses an overweight condition when too much of an ingredient has been placed into the hopper during a particular charging step. This circuit operates to shut off the flow of an ingredient into the hopper, prevent step switch 58 from moving to the next position and operate an alarm signal the operator of the overweight condition.

Each of the three trigger circuits 100, 110 and 120 is of similar construction so only one is described in detail. Considering the feed cut off trigger 100, the under-over signal on line 69 is applied directly to the input of an amplifier 102 through a resistor 101 which is bypassed by two oppositely poled protection diodes 103a and 103b. A bias signal is provided to set the conduction point of amplifier 102 from a voltage divider formed by fixed resistor 104, potentiometer 105 and fixed resistor 106 connected between the positive and negative terminals 11 and 12 of the power supply. The amount of bias is set by moving the slider arm of potentiometer 105 and applying the voltage tapped off through a fixed resistor 107 to the input of amplifier 102 which is of the operational type having high gain and feedback to provide stability. A zener diode 107 sets the amount of feedback at zero or a fixed value while a capacitor 108 provides a feedback path at high frequency to minimize noise.

Each of the other two triggers 110 and 120 is constructed in a manner substantially identical to that of trigger 100 so no description thereof is given. The respective components for the amplifiers 110 and 120 are given reference numerals which are higher by ten and twenty, respectively, than the reference numerals for the components of trigger 100. Each of the triggers 100, 110 and 120 switches rapidly from one (conductive) state to another (non-conductive), or vice versa, in response to a predetermined amplitude voltage sensed at its input from the over-under line 69.

The normal sequence of events that occurs on line 69 after the stepping switch 58 has started a new step during a charging cycle is that the voltage on over-under line 69 decreases from a maximum positive condition, corresponding to maximum underweight condition, to zero corresponding to a balanced condition and then to a negative voltage corresponding to an overweight condition. Trigger 100 is set by its bias control 105 to have one state, say conductive (hereafter designated by a binary 1) in response to a signal on line 69 corresponding to greater than a predetermined amount of underweight, for example two pounds. When the signal on line 69 corresponds to less than a two pound underweight then the state of the trigger 100 switches, meaning that it goes from a binary 1 to a binary 0.

The underweight trigger 110 has its bias control 115 set so that amplifier 112 is fully conductive (binary 1) in response to a signal corresponding to a greater amount of underweight, for example six pounds. When the signal on line 69 corresponds to six pounds underweight or less, trigger 110 switches to a non-conductive (binary 0) state. Trigger 120 has its bias control 125 set so that it is triggered from conduction to non-conduction at predetermined overweight condition, for example six pounds overweight. Therefore the output of trigger 120 is a binary 1 until a six pound overweight condition exists in response to which it becomes a binary 0.

SUPERVISORY LOGIC CIRCUITS

(A) General description

For purposes of explanation, the supervisory logic circuits are described using a convention that a binary 1 is a negative polarity voltage signal and a binary 0 is a less negative or zero voltage signal. By the appropriate selection of the logic circuits, voltage polarities and other factors, the reverse voltage convention and/or binary designations can be produced. Also, the NOR circuits referred to below are of the conventional type which upon receiving a 1 input produce a 0 output and upon having a 0 input produce a 1 output. These NOR circuits generally comprise a diode input gate and an inverter element.

The purpose of the logic circuit is to control the energization of a drive coil 130 (FIG. 4) for the stepping switch 58 and the application of voltage to the contacts of deck 58–10 to control the actuation of a respective valve 3 through a valve solenoid 3b. Switch coil 130 is energized by a driver amplifier 132 while the enabling voltage for the valves 3 applied through the contacts of switch deck 58–10 is produced by a similar driver amplifier 134. Both driver amplifiers 132 and 134 are conventional in the art and become conductive upon application of a 0 signal at its input.

(B) Underweight—More than six pounds

To describe the operation of the logic circuit, consider that an operation selector switch 201 (FIG. 4) and a cycle hold switch 200 are set for normal automatic, repeating cycle operation and the contacts controlled by these switches are in the positions shown. Also consider that the system is just starting operation on step 2 of the charging cycle so that the wipers of all of the decks of the switch 58 engage the number "2" contacts and the analog voltage from circuits 40–1 and 40–2 are being applied to line 22. Since the step has just commenced and the gross weight of the hopper is more than six pounds underweight, the underweight (positive) signal present on over-under bus 69 causes each of the outputs of triggers 100, 110 and 120 to have a binary 1 output. The 1 (negative) output of the underweight trigger 110 passes through a diode 140 and is applied to the input of a NOR circuit 142 whose 0 output is applied to the input of another NOR circuit 144. Another diode 141 is connected between the input of NOR 142 and ground. Diodes 140 and 141 are safety devices to isolate trigger 110 from faults occurring in the supervisory logic circuits. Diode 140 blocks negative current from entering trigger 110 while blocking positive signals from entering NOR 142. Diode 141 shorts positive current to ground.

In response to a 0 input NOR 144 has a 1 output which is applied to one input of a two input NOR 146. The 0 output of NOR 146 is applied to one input of a three input NOR 148. It should be understood in multiple input NOR circuits that a 1 appearing on any input line produces a 0 output but all input lines must have 0 inputs to produce a 1 output.

With the underweight condition existing, feed cut-off trigger 100 also a 1 output which is applied through a diode 150 to a NOR 152 input whose 0 output is applied to a second input of NOR 148. Diodes 150 and 151 at the output of trigger 100 serve the same purpose as diodes 140 and 141. The third (center) input to NOR 148 is also 0 from normally open over/under bypass switch 202 at this time so that NOR 148 has a 1 output. This is applied to a NOR 154 whose 0 output is applied to driver amplifier 134 to make it conduct and apply a voltage to contact "2" of deck 58–10. This energizes solenoid 3b–2 so that the differential control element 3a–2 of valve 3–2 is effective to start dispensing the ingredient from container 2—2 under control of the feed rate controller.

The 1 output of NOR 148 is also applied through a diode 149 to one input of a three input NOR 160 to produce a 0 input for one input of a series connected two input NOR 162. The other input to NOR 162 is also from normally open over/under bypass switch 202 and it is always 0 unless switch 202 is closed. The two 0 inputs of NOR 162 produce a 1 output which cannot cause stepping switch driver amplifier 132 to conduct. Therefore, switch coil 130 receives no current and the step switch 58 is left in position "2."

When underweight trigger 110 produces a 1, the 1 output of NOR 144 energizes an amplifier 300 which energizes the coil 302 of a relay, the coil having one end connected to a negative voltage source 12a of lower voltage than source 12. This closes contact 302a and connects one terminal of a lamp 304 to the negative supply terminal 12. The other terminal of the lamp 304 is connected to ground 13 so the lamp lights. This provides a visual "underweight" indication.

(C) Underweight less than six pounds

When the over-under signal on line 69 diminishes to a point where underweight trigger 110 changes its state, underweight less than six pounds, the 0 output of trigger 110 produces a 1 at the output of NOR 142 and a 0 at the output of NOR 144. Feed cut-off trigger 100 still has a 1 output so that NOR 152 has a 0 output and the 1 output of NOR 148 previously established is coupled back to one input of NOR 146 to produce a 0 output. This holds NOR 148 with a 1 output so that driver amplifier 134 remains conductive and amplifier 132 non-conductive. The 0 output of NOR 144 causes relay 302 to drop out and extinguish lamp 304.

(D) Balance

With the output of underweight trigger 110 still being 0, feed cut off trigger 100 changes its state to also produce a 0 output when the underweight signal falls below a certain level, illustratively two pounds. In response to the 0 input signal the output of NOR 152 changes to a 1 so that the output of NOR 148 is a 0 which is applied to the upper input of three input NOR 154. The center input to NOR 154 from normally open "cycle hold" switch 200 is 0. The lower input to NOR 154 from the output of a two input NOR circuit 240 is also normally 0 since NOR 240 receives a 1 input from a NOR 242 whose input signal is normally a 0 except when switch deck 58–9 has its wiper arm in the "CH" contact position to apply negative voltage, a 1 signal, from supply 12 through the wiper arm and contact CH of deck 58–9. With three 0 inputs, NOR circuit 154 has a 1 output which renders driver amplifier 134 non-conductive to remove the voltage from contact "2" of deck 58–10 and thereby disable valve 3–2 by deenergizing solenoid 3b–2.

The 0 output of NOR 148 is also applied through diode 149 to the input of NOR circuit 160, which has four other input signal sources. This center input also receives the 0 output of NOR 240 through a diode 251 and the 0 output of normally open cycle hold switch 200 through diode 253. Another input is from a diode 255 connected to the output of a two input NOR circuit 258 which has one input connected to the output of a three input NOR circuit 260. One of the inputs to NOR 260 is from NOR 142 which has a 1 output at this time. Therefore, NOR 260 has a 0 output. The other input to NOR 258 is a 1 through a contact 263 on the stepping switch 58 which is connected to the negative voltage supply 12 when the switch 58 is in a position where its wiper arms engage the other contacts. This produces a 0 signal at the output of NOR 258 which is applied through diode 255 to the center input of NOR 160.

The last connection to the center input of NOR 160 is through a diode 271 connected to the output of a three input NOR circuit 274 whose center input is connected to the output of a time delay circuit 280. This circuit is, for example, a conventional capacitive charging circuit which is effectively an OR circuit with an input delay. The time delay acts as an acceptance period to insure that the correct weight has been achieved in the hopper before stepping switch 58 to another position. Thus, time delay circuit 280 is controlled by a NOR circuit 284 which receives a 0 signal at its center input from the output of NOR 144 after the underweight trigger has flipped at less than six pounds underweight; a 0 input at its upper input from the output of NOR 148; and a 0 input from the output of a NOR circuit 288 connected to its lower input. NOR 288 receives the output from overweight trigger 120 through a diode 289, this output being a 1 until a six pound overweight condition is reached. Diodes 289 and 290 serve the same purpose as diodes 140 and 141.

The three 0 inputs to NOR 284 cause it to produce a 1 output. This 1 output is applied to an amplifier 310 to make it conduct and cause a relay 312 to close contact 312a and light a "correct weight" lamp 314.

After a predetermined time, for example three seconds, during which a 1 at the output of NOR 284 indicates a correct weight, the time delay circuit 280 OR's the 1 into the center input of NOR 274. The resultant 0 output of NOR 274 completes the fifth 0 input signal to the center input of NOR 160. It should be understood that lamp 314 is on for approximately three seconds before this happens.

The upper input of NOR 160 receives the output from a free-running multivibrator 290 formed by a pair of NOR circuits 291 and 292 whose inputs and outputs are cross-coupled by capacitors 293 and 294. As is conventional in this type of circuit, the discharge time constant of the capacitors are selected to control the on-off duty cycle of each of the NOR circuits 291 and 292. Consequently, NOR 291 produces a 1 output for a predetermined portion of each cycle as determined by the capacitors. In the embodiment of the invention being described, NOR 291 produces a 1 for approximately 100 milliseconds and a 0 for approximately 750 milliseconds during each cycle. This cycle is free running and repetitive.

During the time (750 milliseconds) that NOR 291 produces a 0 on the top input line to NOR 260 and the other two inputs to NOR 160 are also 0, a 1 input signal is applied to the center input of NOR 162. This provides a 0 input signal to the driver amplifier 132 and causes it to conduct to energize the coil 130 of stepping switch 58 and step the wiper arms of the switch over to contact "3." Here, the ingredient charging operation for the third ingredient from container 2-3 is commenced in the same manner as that described for the ingredient from container 2—2. At all times, of course, the discharge rate is under the control of the flow rate controller 8.

(E) *Overweight*

When an overweight condition of more than six pounds occurs, the output of overweight trigger 120 switches to a 0 producing a 1 at the output of NOR 288 and a 0 at the output of NOR 284. The 0 output of NOR 284 keeps "correct weight" lamp 314 from turning on while the 1 at the output of NOR 288 energizes an amplifier 320 to close contact 322a of a relay 322 and light an "overweight" lamp 324.

The 0 output of NOR 284 prevents the time delay circuit 280 from being energized so that the center input of NOR 160 has a 1 signal which prevents the stepping switch coil 130 from being actuated. The overweight condition is corrected normally, such as by the operator removing some of the contents from the hopper 4, or else the particular step is by-passed in a manner to be described below.

(F) *Alarm*

An alarm relay 350 is provided to indicate if a charging step has not been carried out within a predetermined time. As indicated above, a 0 is produced at the output of NOR 274 when weight balance is achieved for a charging step. During the time when there is no balance, NOR 274 has a 1 output. The middle input to NOR 274 from delay circuit 280 is a 0 brought about by a 1 input to NOR 284 from NOR 288 during overweight or a 1 input to NOR 284 from NOR 144 during underweight. The upper input to NOR 274 through a resistor 275 and the lower input from NOR 260 are always 0 except when switch deck 58–9 is in the CO position. NOR 260 is held with a 0 output by a 1 input on its lower line from a pair of cross-coupled NOR circuits 360 and 361, which form a memory. The input to NOR 360 is a 0 unless a contact 365 is closed while the input to NOR 361 is also a 0 unless a pair of contacts 366 and 367 are closed. With the two 0 inputs NOR 361 produces a 1 output which holds the output of NOR 260 and the input of NOR 274 at 0.

With a 0 signal at each of its three inputs, NOR 274 produces a 1 output. If the 1 output persists for a predetermined time, for example two minutes, it enables a second time delay circuit 370 which is similar to circuit 280. This causes the delay circuit 370 to produce a 1 output which is applied through a NOR circuit 372 to actuate an amplifier 374 controlling the alarm relay 350 and the coil 342 of a relay to close contact 342a to energize an "alarm" lamp 344. The alarm relay 350 can actuate any other suitable device, such as a horn, to signal the operator that the system is operating abnormally. It should be understood that the presence of a balance condition, a 1 at the output of time delay circuit 280, at a frequency greater than once every two minutes, or some other predetermined period, prevents the alarm time delay circuit 370 from operating.

(G) *Indicators*

Switch deck 58–9 (FIG. 3) operates a bank of indicator lamps 400–1 through 400–8, 400 CO and 400 CH by applying a voltage from source 12 to each lamp through the wiper arm of the deck and a respective correspondingly numbered contact. The upper terminal of each lamp 400–1 through 400–8 is connected to ground 13 through a resistor 401 to limit the lamp current while the upper terminals of lamps 400 CH and 400 CO are connected directly to ground. Therefore, switch deck 58–9 energizes a lamp 400 corresponding to the step of the cycle being carried out to provide a visual indication to the operator.

(H) *Weighing cycle complete*

The control of the sequential stepping of switch 58 is carried on by the supervisory logic circuits from positions "3" through "8" in the manner described for position "2." When the eight step of the charging cycle is completed, a balance condition exists on bus 69 and the logic circuits shut off valve 3–8 and step switch 58 moves the wiper arms of its decks to the "CO" position, meaning that the weighing cycle is completed. Lamp 400 "CO" comes on through switch deck 58–9.

With switch 58 in the "CO" position contact 263 opens and applies a 0 to the lower input of NOR 258. The upper input to NOR 258 is also a 0 since its upper input from the output of NOR 260, which receives a 1 from NOR 361, is a 0. Thus, NOR 258 produces a 1 output which is applied through diode 255 to NOR 160 causing it to have a 0 output. This keeps amplifier 132 deenergized so the step switch 58 cannot operate. All valves 3 are closed since switch deck 58–10 does not energize any relays 3b.

Thus, in the "CO" position the ingredient feed is shut off and the system is awaiting a further command with a full batch in the hopper 4.

(I) *Blender charging*

In the "CO" position, switch deck 58-9 closes a contact 450 to apply a voltage through a normally closed contact 452d of a switch 452 and a NOR 453 to energize an amplifier 454 which actuates a blender charge relay 455. Relay 455 operates an external circuit (not shown) to signal a blender 470 that a completed batch is waiting in the hopper. If the blender is ready to receive the batch, it automatically moves into position under the hopper and closes a contact 366 (FIG. 4). With relay 455 still energized, the blender extends its seal shroud (not shown) and opens its input valve. The details of the mechanism for moving the blender and opening its inflow valve are not shown since they, in themselves, are not part of the invention.

Extension of the blender seal shroud closes a contact 367 and also pushes up on the hopper bottom to produce a false underweight signal. This causes trigger 110 to have a 1 output and NOR 142 a 0 output which is applied to the upper input of NOR 260. The middle input to NOR 260 is a 0 until deck 58-9 (FIG. 3) is in the CH position while closing of both contacts 366 and 367 applies a 1 signal to the input of the lower cross-coupled memory NOR 361. This applies a 0 to the lower input of NOR 260 making a total of three 0 inputs to NOR 260 which now produces a 1 output and NOR 258 a 0 output. Since all of the inputs to NOR 160 are 0 its 1 output causes NOR 162 to produce a 0 output which operates the step switch coil amplifier 130 moving switch 58 to the "CH" position.

The 0 output of the cross-coupled NOR memory 361 is applied to the upper input of NOR 240 and the wiper arm of deck 58-9 in the "CH" position applies a 1 through a resistor 241a to charge a capacitor 241b at the input of NOR 242. After capacitor 241b has charged to the necessary negative voltage, the output of NOR 242 is changed to a 0 so that NOR 240 produces a 1 which, as applied to the lower input of NOR 154, causes NOR 154 to have a 0 output and cause valve driver amplifier 134 to conduct. Driver 134 places a voltage on contact "CH" of deck 58-10 and opens the outflow valve 10 of the hopper permitting the contents to dump into the engaged blender 460. The capacitor 241b is used to add a time delay to the opening of the hopper outflow valve to insure that the blender is in place to receive the ingredients from the hopper.

The blender operates after a predetermined time, which corresponds to a time during which the hopper should be emptied entirely, to close its inflow valve, open contacts 366 and 367 and close a contact 365. This changes the output of cross-coupled NOR 361 memory to a 1 and makes the output of NOR 240 a 0. NOR 154 now has a 1 output thereby turning off the driver amplifier 134, taking the voltage off contact CH of deck 58-10 and closing the hopper outflow valve 10. At this time the upper input to NOR 154 is a 0 since NOR 148 is supplied a 1 input through the wiper arm of deck 58-9 and a diode 148a when switch 58 is in the "CH" position. The center input to NOR 154 from normally open switch 200 is also 0. Thus, hopper 4 is ready to begin another charging cycle and the blender 460 is ready to be started.

(J) *Automatic cycling*

When switch 58 is in the "CH" position no analog signals are applied to summing line 22 from the weight selector circuit 40. The only signal on line 22 is from the gross weight amplifier 20 which measures the gross weight of the hopper. If the gross weight of the hopper is zero, meaning that all of the ingredients have been discharged into the blender 460, then the signal on the over-under bus 69 is the same as for a balance condition. Thus, triggers 100, 110 and 120 produce a set of signals which cause time delay circuit 280 to have a 1 output and produce a 0 output from NOR 274. All five inputs to NOR 160 are 0 so amplifier 132 is energized to step switch 58 to position "1" to start another batching cycle.

With switch 58 in the "1" position, the analog signal from circuit 40-1 is applied to line 22 to set the feed rate controller 8 into operation. All contacts 365, 366 and 367 are open and contact 263 is again closed. The driver amplifier 134 is operated to open valve 3-1 by the 1 output of NOR 148 which is produced in response to the underweight condition on the over-under bus 69. The automatic dispensing of the ingredient from container 2-1 into the hopper begins and a new cycle commences. This cycle operates in the manner previously described to step through ingredient dispensing position "2" through "8" and positions "CO" and "CH."

(K) *Blender start*

With switch 58 in the "1" position a 1 signal is applied through a resistor 461 and a NOR 462 to operate an amplifier 464. When amplifier 464 conducts it energizes a blender start relay 465 which starts the blender into operation to mix the preceding batch. At the same time the blender operates, ingredients from the container 2-1 and other containers are being dispensed into the hopper 4. The blender operates for a predetermined time and then automatically shuts itself off to await completion of the batch being mixed.

(L) *Manual operating modes*

The system also has provision for full manual operation and various other manual operating features. These are described below.

(1) *Ingredient Pass.*—As explained above, any ingredient can be left out of a batch by closing switch 46 and preventing the analog signal from the corresponding circuit 40 from being added to line 22.

(2) *Bypass.*—In certain situations a batching step will end with an overweight or underweight error which is small enough to be ignored. However, the presence of the error will not permit the step switch to operate to advance the cycle to the next step. Operation of the over-under bypass switch 202 permits the error to be ignored and moves the switch to the next step.

Closing switch 202 applies a 1 through contact 263 and a capacitor 202a to the input of NOR 162. The resultant 0 output of NOR 162 operates amplifier 132 to step switch 58 one position. The 1 from contact 263 is also applied through a diode 202b to the center input of NOR 148 causing it to apply a 0 to the upper input of NOR 154. The other two inputs to NOR 154 are also 0 at this time so that a 1 output is produced which turns off driver amplifier 134 and keeps all valves 3 closed.

(3) *Cycle hold.*—The cycle can be held at any step by closing switch 200. This applies a 1 to the center input of NOR 154 whose resultant 0 output holds driver amplifier 134 on thereby applying a voltage to the connected contact of switch deck 58-10 to hold the corresponding valve 3 open. The 1 signal from switch 200 is also applied through diode 253 to the center input of NOR 160 whose 1 output at the upper input to NOR 162 combines with the 0 at the lower input to cause NOR 162 to produce a 1 output which keeps amplifier 132 deenergized holding switch 58 at the same position.

(4) *Manual operation.*—Manual control of the system is achieved by turning switch 201 to the "MAN" position, moving all contacts 452a through 452d down. This applies a 1 through contacts 263, 452c and a closed cycle advance switch 203 to the lower input of NOR 160 making its output a 0 and the output of NOR 162 a 1 to keep amplifier 132 deenergized. NOR 154 is still controlled by the triggers 100, 110 and 120 in steps "1" through "8" so that the feed rate controller 8 is operative to dispense the ingredient into the hopper until a balance condition is achieved and the respective valve 3 is closed.

By opening switch 203, the 1 is taken off the lower input of NOR 160 permitting it to pass a 0 to NOR 162 when a balance condition is obtained. This causes switch 58 to advance one step. When switch 203 is closed with switch 201 in MAN the system stops after completing the filling operation for the step and holds the cycle until cycle advance switch 203 is again opened permitting another step to be started and the dispensing portion of that step completed.

In the foregoing description, certain of the amplifiers, for example drivers 132 and 134, are operated in response to a 0 input while others, such as 300, 310 and 320, are operated in response to a 1 input. Such amplifiers, operating in response to 0 or 1 inputs are conventional in the art. For example, a PNP transistor conducts in response to a 1 (negative) input while an NPN transistor conducts in response to a 0 (positive) input at the base electrodes. Such techniques are well within the skill of the art.

It therefore can be seen that a batch weighing system has been disclosed which is substantially all electronic and operating with electronic logic circuits and in which no alternating current signals are used.

While a preferred embodiment of the invention has been described above, it will be understood that this is illustrative only, and the invention is limited solely by the appended claims.

What is claimed is:

1. A batch weighing system for controlling the charging of a predetermined quantity of each of a number of ingredients into a common container comprising:
   a plurality of weight selector circuits, each circuit having means for producing an analog signal corresponding to the weight of an ingredient to be charged,
   means for determining the weight of the ingredients in the common container and for producing an analog signal corresponding thereto,
   means comparing the analog signals from said weight selector circuits and from said weight determining means and producing an error signal corresponding to the difference in weight therebetween,
   means for determining an error signal corresponding to a weight difference of less than a predetermined weight and producing a first control signal representative thereof,
   means responsive to said first control signal for applying the analog signal from another of said weight selector circuits to said comparing means,
   means connected to said comparing means for producing a second control signal corresponding to the condition of an excess of weight in the common container,
   and means responsive to said second control signal for arresting the application of the analog signal from another of said weight selector circuits to said comparing means.

2. A batch weighing system for controlling the charging of a predetermined quantity of each of a number of ingredients into a common container comprising:
   a plurality of weight selector circuits, each circuit having means for producing an analog signal corresponding to the weight of an ingredient to be charged,
   means for determining the weight of the ingredients in the common container and for producing an analog signal corresponding thereto,
   means comparing the analog signals from said weight selector circuits and from said weight determining means and producing an error signal corresponding to the difference in weight therebetween,
   a controller for sequentially applying the analog signal from each weight selector station to said comparing means so that the analog signals applied thereto are additive,
   means for determining an error signal corresponding to a weight difference of less than a predetermined weight and producing a first control signal representative thereof,
   means responsive to the production of a said first control signal for actuating said controller to add the analog voltage from another weight selector circuit to said comparing means,
   and means connected between said error signal determining means and said controller and responsive to said first control signal to delay actuation of said controller for a predetermined time.

3. A batch weighing system for controlling the charging of a predetermined quantity of each of a number of ingredients into a common container comprising:
   a plurality of weight selector circuits, each circuit having means for producing an analog signal corresponding to the weight of an ingredient to be charged,
   means for determining the weight of the ingredients in the common container and for producing an analog signal corresponding thereto,
   means comparing the analog signals from said weight selector circuits and from said weight determining means and producing an error signal corresponding to the difference in weight therebetween,
   a controller for sequentially applying the analog signal from each weight selector station to said comparing means so that the analog signals applied thereto are additive,
   means for determining an overweight error signal corresponding to a weight difference of greater than a predetermined weight in which the weight of the ingredients in the hopper exceeds the weight of the ingredients represented by the analog signals from said weight selector circuits as applied to said comparing means and producing a second control signal corresponding thereto,
   and means responsive to said second control signal for arresting the actuation of said controller.

4. A batch weighing system as set forth in claim 3 and further comprising:
   an alarm,
   and means responsive to the occurrence of said second control signal for a predetermined time for actuating said alarm.

5. A batch weighing system for controlling the charging of a predetermined quantity of each of a number of ingredients into a common container comprising:
   a plurality of weight selector circuits, each circuit having means for producing an analog signal corresponding to the weight of an ingredient to be charged,
   means for determining the weight of the ingredients in the common container and for producing an analog signal corresponding thereto,
   means comparing the analog signals from said weight selector circuits and from said weight determining means and producing an error signal corresponding to the difference in weight therebetween,
   a controller for sequentially applying the analog signal from each weight selector station to said comparing means so that the analog signals applied thereto are additive,
   means for determining an error signal corresponding to a weight difference of less than a predetermined weight and producing a first control signal representative thereof,
   means for determining an overweight error signal corresponding to a weight difference of greater than a predetermined weight in which the weight of the ingredients in the hopper exceeds the weight of the ingredients represented by the analog signals from said weight selector circuits as applied to said comparing means and producing a second control signal corresponding thereto, and means responsive to the absence of a first control signal or the presence of a second control signal for a predetermined time for arresting the actuation of said controller.

6. A batch weighing system for controlling the charging of a predetermined quantity of each of a number of ingredients into a common container comprising:
   a plurality of weight selector circuits, each circuit having means for producing an analog signal corresponding to the weight of an ingredient to be charged,
   means for determining the weight of the ingredients in the common container and for producing an analog signal corresponding thereto,
   means comparing the analog signals from said weight selector circuits and from said weight determining means and producing an error signal corresponding to the difference in weight therebetween,
   first and second means for respectively determining an error signal corresponding to underweight weight differences of less than corresponding first and second predetermined amounts between the weight of the ingredients in the common container and the weight of the ingredients represented by the analog signals applied to said comparing means from said weight selecting means and producing first and second control signals corresponding thereto,
   means for controlling the flow of each ingredient to said common container,
   a controller for sequentially applying the analog signal from each weight selector station to said comparing means so that the analog signals applied thereto are additive,
   means responsive to the production of a said first control signal for causing said flow controlling means to shut off flow of the ingredient corresponding to the analog signal being applied from a weight selector circuit to said comparing means,
   and means responsive to the production of a said second control signal for actuating said controller to add the analog voltage from another weight selector circuit to said comparing means.

7. A system as set forth in claim 6 wherein there is a respective flow control means for each ingredient and said controller also controls the actuation of the flow control means of the ingredient whose weight is selected by a corresponding weight selector circuit.

8. A batch weighing system as set forth in claim 7 wherein said means for actuating said controller means operates only after said second control signal has been produced for a predetermined time.

9. A batch weighing system for controlling the charging of a predetermined quantity of each of a number of ingredients into a common container comprising:
   a plurality of weight selector circuits, each circuit having means for producing an analog signal corresponding to the weight of an ingredient to be charged,
   means for determining the weight of the ingredients in the common container and for producing an analog signal corresponding thereto,
   means comparing the analog signals from said weight selector circuits and from said weight determining means and producing an error signal corresponding to the difference in weight therebetween,
   first and second means for respectively determining an error signal corresponding to underweight weight differences of less than corresponding first and second predetermined amounts between the weight of the ingredients in the common container and the weight of the ingredients represented by the analog signals applied to said comparing means from said weight selecting means and producing first and second control signals corresponding thereto,
   means for controlling the flow of each ingredient to said common container,
   means responsive to said error signal for throttling the outflow of an ingredient into said common container at a rate corresponding to the rate of reduction of said error signal,
   a controller for sequentially applying the analog signal from each weight selector station to said comparing means so that the analog signals applied thereto are additive,
   means responsive to production of a said first control signal for causing said flow controlling means to shut off flow of the ingredient corresponding to the analog signal being applied from a weight selector circuit to said comparing means,
   and means responsive to the production of a said second control signal for actuating said controller to add the analog voltage from another weight selector circuit to said comparing means.

10. A system as set forth in claim 9 wherein there is a respective flow control means for each ingredient and said controller also controls the actuation of the flow control means of the ingredient whose weight is selected by a corresponding weight selector circuit.

11. A batch weighing system for controlling the charging of a predetermined quantity of each of a number of ingredients into a common container comprising:
    a plurality of weight selector circuits, each circuit having means for producing an analog signal corresponding to the weight of an ingredient to be charged,
    means for determining the weight of the ingredients in the common container and for producing an analog signal corresponding thereto,
    means comparing the analog signals from said weight selector circuits and from said weight determining means and producing an error signal corresponding to the difference in weight therebetween,
    first and second means for respectively determining an error signal corresponding to underweight weight differences of less than corresponding first and second predetermined amounts between the weight of the ingredients in the common container and the weight of the ingredients represented by the analog signals applied to said comparing means from said weight selecting means and producing first and second control signals corresponding thereto,
    means for controlling the flow of each ingredient to said common container,
    a controller for sequentially applying the analog signal from each weight selector station to said comparing means so that the analog signals applied thereto are additive,
    means responsive to production of a said first control signal for causing said flow controlling means to shut off flow of the ingredient corresponding to the analog signal being applied from a weight selector circuit to said comparing means,
    and means responsive to the production of a said second control signal for actuating said controller to add the analog voltage from another weight selector circuit to said comparing means,
    and means responsive to the absence of a first or a second control signal for a predetermined time for arresting operation of said controller and stopping the outflow of an ingredient into said common container.

12. A batch weighing system for controlling the charging of a predetermined quantity of each of a number of ingredients into a common container comprising:
    a plurality of weight selector circuits, each circuit having means for producing an analog signal corresponding to the weight of an ingredient to be charged,
    means for determining the weight of the ingredients in the common container and for producing an analog signal corresponding thereto,
    means comparing the analog signals from said weight selector circuits and from said weight determining means and producing an error signal corresponding to the difference in weight therebetween, first and second means for respectively determining an error signal corresponding to underweight weight differences of less than corresponding first and second predetermined amounts between the weight of the ingredients in the common container and the weight of the ingredients represented by the analog signals applied to said comparing means from said weight selecting means and producing first and second control signals corresponding thereto, third means for determining an error signal corresponding to an overweight weight difference of greater than a predetermined amount between the weight of the ingredients in the common container and the weight of the ingredients represented by the analog signals from said weight selector circuits applied to said comparing means and producing a third control signal representative thereof, means for controlling the flow of each ingredient to said common container, a controller for sequentially applying the analog signal from each weight selector station to said comparing means so that the analog signals applied thereto are additive, means responsive to production of a said first control signal for causing said flow controlling means to shut off flow of the ingredient corresponding to the analog signal being applied from a weight selector circuit to said comparing means, means responsive to the production of a said second control signal for actuating said controller to add the analog voltage from another weight selector circuit to said comparing means, and means responsive to said third control signal for arresting the actuation of said controller and stopping the outflow of an ingredient into said common container.

13. A batch weighing system for controlling the charging of a predetermined quantity of each of a number of ingredients into a common container comprising:

a plurality of weight selector circuits, each circuit having means for producing an analog signal corresponding to the weight of an ingredient to be charged, means for determining the weight of the ingredients in the common container and for producing an analog signal corresponding thereto, means comparing the analog signals from said weight selector circuits and from said weight determining means and producing an error signal corresponding to the difference in weight therebetween, a controller for sequentially applying the analog signal from each weight selector station to said comparing means so that the analog signals applied thereto are additive, means responsive to the error signal for sequentially producing first and second control signals corresponding to underweights of first and second amounts, means responsive to the error signal between the occurrence of said first and second control signals for producing a signal to control the rate of material flow to the hopper, and means responsive to the production of a said second control signal for actuating said controller to add the analog voltage from another weight selector circuit to said comparing means.

14. A batch weighing system for controlling the charging of a predetermined quantity of each of a number of ingredients into a common container comprising:

a plurality of weight selector circuits, each circuit having means for producing an analog signal corresponding to the weight of an ingredient to be charged, means for determining the weight of the ingredients in the common container and for producing an analog signal corresponding thereto, means comparing the analog signals from said weight selector circuits and from said weight determining means and producing an error signal corresponding to the difference in weight therebetween, first and second means for respectively determining an error signal corresponding to underweight weight differences of less than corresponding first and second predetermined amounts between the weight of the ingredients in the common container and the weight of the ingredients represented by the analog signals applied to said comparing means from said weight selecting means and producing first and second control signals corresponding thereto, a controller for sequentially applying the analog signal from each weight selector station to said comparing means so that the analog signals applied thereto are additive, a respective means for controlling the flow of each ingredient to said common container, means responsive to production of a said first control signal for causing said controller to shut off flow of the ingredient corresponding to the analog signal being applied from a weight selector circuit to said comparing means, means responsive to the production of a said second control signal for actuating said controller to add the analog voltage from another weight selector circuit to said comparing means, and means responsive to the first control signal produced in response to the application of the analog signals from all of said weight selector circuits to discharge the ingredients from the common container.

15. A batch weighing system for controlling the charging of a predetermined quantity of each of a number of ingredients into a common container comprising:

a plurality of weight selector circuits, each circuit having means for producing an analog signal corresponding to the weight of an ingredient to be charged, means for determining the weight of the ingredients in the common container and for producing an analog signal corresponding thereto, means comparing the analog signals from said weight selector circuits and from said weight determining means and producing an error signal corresponding to the difference in weight therebetween, and integrating type amplifier means responsive to said error signal for controlling the flow charging rate of the ingredients into said common container, said amplifier means including feedback means for preventing saturation in response to low amplitude input error signals applied for a period of time.

16. A system as set forth in claim 15 wherein said feedback means is a non-linear, voltage sensitive resistor.

17. A batch weighing system for controlling the charging of a predetermined quantity of each of a number of ingredients into a common container comprising:

a plurality of weight selector circuits, each circuit having means for producing an analog signal corresponding to the weight of an ingredient to be charged, means for determining the weight of the ingredients in the common container and for producing an analog signal corresponding thereto, means comparing the analog signals from said weight selector circuits and from said weight determining means and producing an error signal corresponding to the difference in weight therebetween, means connected to the output of said comparing means for producing a rate signal corresponding to the rate at which the error signal changes, and integrator type amplifier means connected to the outputs of said comparing means and said rate signal producing means for controlling the flow charging rate of the ingredients into said common container, said amplifier means including feedback means for preventing saturation in response to low amplitude error signals applied for a period of time.

18. A system as set forth in claim 17 wherein said feedback means is a non-linear, voltage sensitive resistor.

19. A batch weighing system for controlling the charging of a predetermined quantity of each of a number of ingredients into a common container comprising:

a plurality of weight selector circuits, each circuit having means for producing an analog signal corresponding to the weight of an ingredient to be charged, means for determining the weight of the ingredients in the common container and for producing an analog signal corresponding thereto, means comparing the analog signals from said weight selector circuits and from said weight determining means and producing an error signal corresponding to the difference in weight therebetween, means connected to the output of said comparing means for producing a rate signal corresponding to the rate at which the error signal changes, and means responsive to said error signal and said rate signal for producing a signal to control the flow charging rate of an ingredient into said common container.

20. A batch weighing system for controlling the charging of a predetermined quantity of each of a number of ingredients into a common container comprising:

a plurality of weight selector circuits each circuit having means for producing an analog signal corresponding to the weight of an ingredient to be charged, means for determining the weight of the ingredients in the common container and for producing an analog signal corresponding thereto, means for comparing the analog signals from said weight selector circuits and from said weight determining means and producing a direct current type error signal corresponding to the weight difference therebetween, and means connected to the output of said comparing means for producing the first derivative with respect to time of said direct current type error signal.

21. A system as in claim 20 and further comprising means responsive to said direct current type error signal and said time derivative signal for producing a signal to control the flow charging rate of an ingredient into said common container.

References Cited
UNITED STATES PATENTS 3,125,176   3/1964   Bale et al.  ---------- 177—80

RICHARD B. WILKINSON, *Primary Examiner.*

GEORGE H. MILLER, JR., *Assistant Examiner.*